United States Patent [19]

Stotesbury et al.

[11] Patent Number: 5,383,300

[45] Date of Patent: Jan. 24, 1995

[54] LIGHTWEIGHT ROLLER GUIDE AND TIP FOR FISHING RODS

[75] Inventors: Gregory S. Stotesbury; Ian U. Fettes, both of Costa Mesa, Calif.

[73] Assignee: AFTCO Mfg. Co., Inc., Irvine, Calif.

[21] Appl. No.: 134,042

[22] Filed: Oct. 8, 1993

Related U.S. Application Data

[62] Division of Ser. No. 926,831, Aug. 7, 1992, Pat. No. 5,276,991.

[51] Int. Cl.6 .............................................. A01K 87/04
[52] U.S. Cl. .................................................... 43/24
[58] Field of Search ............................................ 43/24

[56] References Cited

U.S. PATENT DOCUMENTS

| | | | |
|---|---|---|---|
| 1,142,796 | 6/1915 | Brugman | 43/24 |
| 2,878,608 | 3/1959 | O'Brien, Jr. | 43/24 |
| 3,165,856 | 1/1965 | Gourley, Jr. | 43/24 |
| 4,428,141 | 1/1984 | Kovalovsky | 43/24 |

OTHER PUBLICATIONS

Mildrum Manufacturing Company, Catalog sheet entitle "Stand Up".

*Primary Examiner*—P. Austin Bradley
*Assistant Examiner*—Chuck Y. Mah
*Attorney, Agent, or Firm*—Richard L. Gausewitz

[57] ABSTRACT

A synthetic resin frame, having a single foot extending laterally from it, has a roller mounted for rotation about a bearing element that extends into holes in the sides of the frame. A combination line guard and bearing-retaining element is snapped over the frame. The ends of the line guard and bearing-retaining element hold the bearing in position, while openings in the line guard guide the line and substantially prevent it from contacting the synthetic resin. The line guard and bearing retainer is formed of material more wear resistant than that of the frame.

6 Claims, 4 Drawing Sheets

LIGHTWEIGHT ROLLER GUIDE AND TIP FOR FISHING RODS

This is a division of application Ser. No. 07/926,831, filed Aug. 7, 1992, for Lightweight Roller Guide and Tip for Fishing Rods, now U.S. Pat. No. 5,276,991.

BACKGROUND OF THE INVENTION

Roller guides and tips for fishing rods have, over a number of decades, become popular on fishing rods used for salt-water sport fishing for relatively large fish, especially game fish. Typically, such roller guides are relatively heavy and have metal frames that are in the great majority of cases supported by two feet. The rollers in the guides are usually held in place by bearings that are in turn secured by screws. The screws are often removed when it is desired to lubricate the bearings.

At least one attempt has been made to popularize roller guides on rods used for relatively small fish, including some fresh-water fish. These guides had frames made of synthetic resin. The guides were a commercial failure and were withdrawn from the market more than a decade ago.

There remains a need for roller guides that are extremely light and that can be used effectively with relatively light line, in the range of two-pound test to twenty-pound test. It is important that the guides do not inhibit to any substantial extent the high flexibility of, or increase substantially the weight of, the lightweight rods used for such fish. It is also important that the roller guides be very strong, be strongly connected to the rod blanks (shafts), be readily lubricated without need for disassembly, and be characterized by very low friction. It is, additionally, important that the roller guides in different sizes be capable of mass production with a minimum number of different component sizes, with minimum labor, etc.

The lightweight roller guide should be so low-friction, strong, economical and light, etc; that it will tend to supplant large numbers of the ring guides now commonly employed on lightweight fishing rods. Such ring guides have a metal or plastic frame in which is—typically—mounted a ring of aluminum oxide, silicon carbide, metal, or other substance believed to be relatively low friction. However, such a ring guide—especially when a fish is on the line—generates friction at the line which is much greater than that generated when roller guides are employed. Furthermore, ring guides tend to break, check, etc. Friction between line and ring guide tends to heat the line, which is undesirable, it being vastly preferred that the generated heat be in the guide itself and not transmitted to the line in any way.

SUMMARY OF THE INVENTION

In accordance with one aspect of the present invention, there is provided a roller guide in which the roller assembly is held in place not by any screws or rivets, etc., but instead by a spring element that is very lightweight, effective and easy to assemble. In accordance with another aspect of the present invention, a metal line guard is provided on the frame of the roller guide and serves to prevent substantial contact between the line and the frame, and also to keep the line on the roller. In accordance with another aspect of the invention, the elements described in the preceding two sentences, are combined in a single simple part that snaps into place on the frame, in a few seconds, and effectively holds the roller assembly in position, guards the frame from the line, and keeps the line on the roller.

In accordance with another aspect of the present roller guide, an extremely lightweight synthetic resin molded frame or body has only a single foot extending therefrom, and that is bound to the blank, the foot being located rearwardly of the body instead of under it. The foot is bound to the blank over a relatively short distance, so as not to tend to stiffen much of such blank. In accordance with another aspect, the body also has a support region spaced from the single foot, and which is not bound to the blank, but is instead adapted to rest thereon when desirable for strength and to separate therefrom when desirable for substantial flexing of the blank. The results are optimized flexibility and strength and minimum tendency to bend the body or cause breakage of foot regions.

In accordance with another aspect of the invention, the foot is bound on the blank and also secured thereto by finish (epoxy), in such manner that there is no tendency for the finish to travel along the frame and get into the roller assembly or other undesired region.

In accordance with another aspect, the exact same rollers, bearings and guard-roller retainer combination elements are employed for greatly different sizes of roller guides, thus minimizing the costs of manufacture of the listed elements. In accordance with another aspect, such elements are further employed on roller tips as distinguished from roller guides to further reduce part costs.

In accordance with another aspect, the combination line guard and roller-retention element, and also the roller itself, are formed of titanium for extreme lightness, strength and corrosion resistance, while the body and foot bearing are molded composites for lightness and strength. The titanium may be coated with titanium nitride to maximize wear resistance.

In accordance with another aspect of the invention, the combination line guard and roller-retention element is associated with the bearing in such manner that lubrication of the bearing may be effected without any disassembly of anything being required.

In accordance with another aspect, the roller and line guard, etc., are provided in a tip.

DETAILED DESCRIPTION OF THE PREFERRED EMBODIMENTS

In the present specification and claims, the word "forward" or "front" denotes that side of each roller guide that is relatively close to the tip of the blank, while the word "rear" denotes that side of each roller guide that is relatively close to the butt and reel.

The invention is described relative to a single-roller guide. It is to be understood that two rollers may also be employed in one guide, normally the guide nearest the butt.

It is to be understood that a set of the present roller guides is mounted fixedly onto an elongate tapered flexible blank (shaft) 10 that is typically formed of graphite, fiberglass, etc. The preferred blank 10 of lightweight rods that are employed with fish lines having test weights in the range of, preferably, two pounds to twenty pounds, are highly flexible especially in their regions relatively remote from the butt B and reel R. Typically, there are six or seven roller guides for each blank. For simplicity, there are here shown five, these being generally denoted 11a, 11b, 11c, 11d, and 11e.

Each roller guide has an extremely lightweight hollow body 12 that is molded integrally of synthetic resin and that is integral with a single foot 13. The entire guide, including body 12 and foot 13, is symmetrical (a mirror image) about a central imaginary plane that extends vertically through the axis of blank 10.

Figure 1:
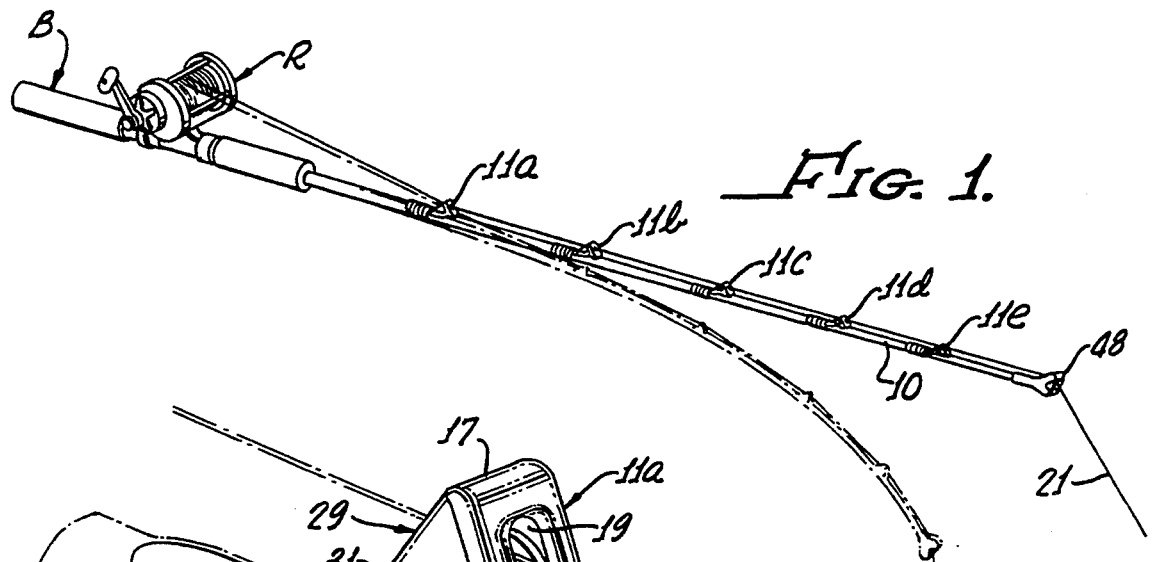
FIG. 1 shows a fishing rod incorporation several of the the present guides, and the tip.
Figure 2:
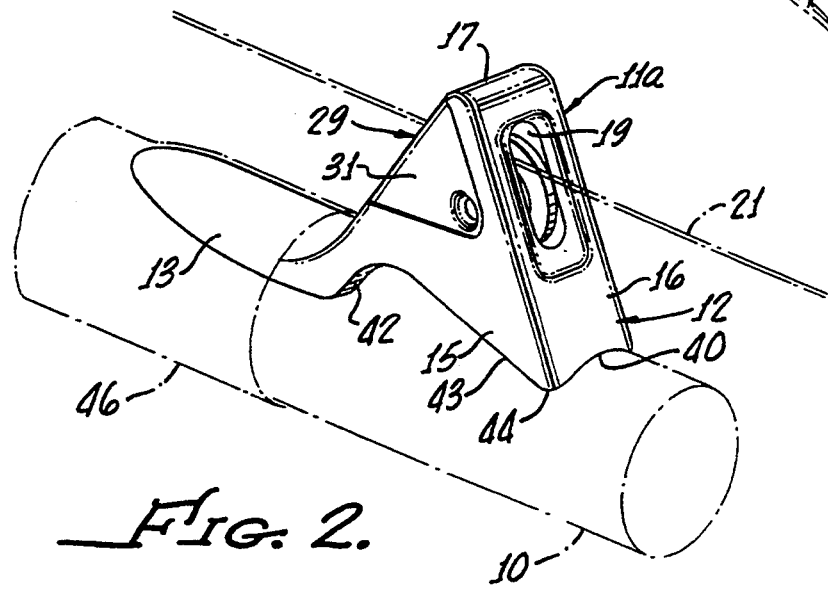
FIGS. 2 and 3 are enlarged isometric views of the guide nearest the butt in FIG. 1.

Body 12 (FIGS. 4 and 5) has parallel sidewalls 15 that are connected integrally to each other by a front wall 16, a top wall 17, and a rear wall 18. Front wall 16 has an opening 19 therein at the upper portion thereof and which is sufficiently large that—because of structure next described—the fish line 21 will not engage any part of front wall 16 except under unusual circumstances. Preferably, the front-wall edges defining opening 19 are bevelled as shown in FIG. 2.

Rear wall 18 has an opening 22 therein (FIG. 4) and which is preferably much larger than front opening 19. However, much of rear opening 22 is covered by means described subsequently.

Figure 10:
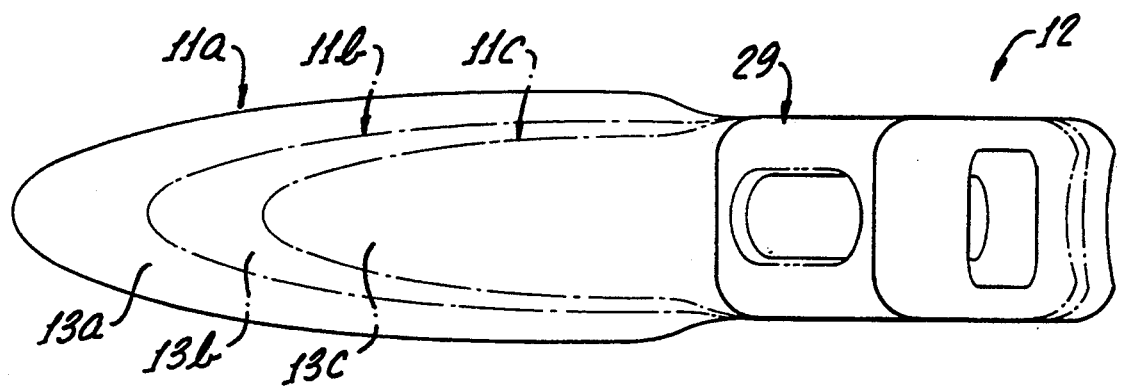
FIG. 10 is a composite plan view showing three guide sizes superimposed on each other.
Figure 9:
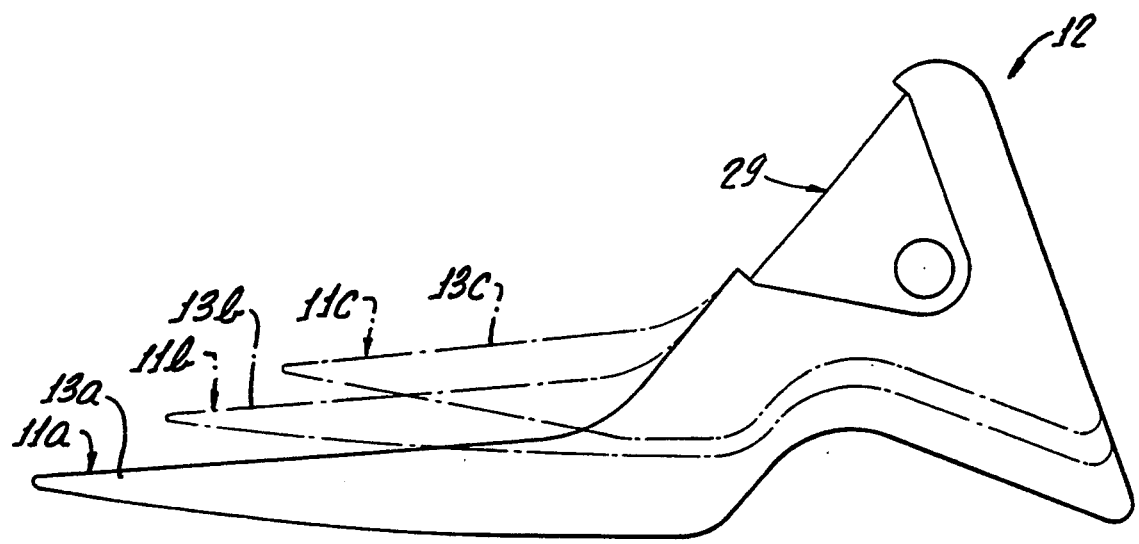
FIG. 9 is a composite side view showing three guide sizes superimposed on each other.

The foot 13 of each roller guide has its center line in the above-indicated vertical plane, and extends away from body 12 toward the butt of the rod. Each foot 13 is elongate longitudinally of blank 10, the degree of elongation being determined by the size of the particular roller guide. Thus, for example, guide 11a has a relatively long (and wide) foot, while guide 11c has a relatively short (and narrow) foot, reference being made to FIGS. 9 and 10.

The bottom of body 12 is open, and the underside of each foot 13 is longitudinally grooved so as to receive in relatively snug-fitting relationship a portion of blank 10. References made to FIG. 6 for example.

The body 12, and its associated foot 13 integral therewith, is molded integrally of (preferably) an acetyl copolymer to which has been added glass fill, polytetrafluoroethylene, and graphite.

Each roller guide 11a, 11b, 11c, 11d and 11e has a roller 24 that is preferably identical to the roller of each other guide, including identity of size. The rollers are formed of titanium for maximize lightness and corrosion resistance. Preferably, each roller 24 has a V-groove therein (FIGS. 4 and 6–8) that is so shaped as to maximize the force tending to cause the roller to rotate with the line but without generating any undesired pinching action in the size range of lines (in a present example, two-pound test to twenty-pound test).

Figure 4:
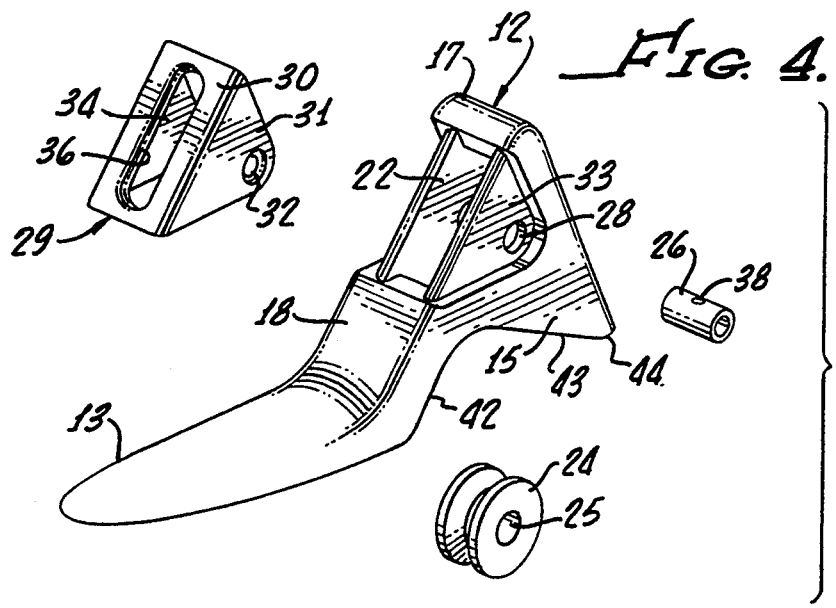
FIG. 4 is an enlarged exploded view of such guide.

Each roller has a cylindrical bore 25 (FIG. 4) therethrough at the axis thereof, and which receives in snug but freely-rotatable relationship a bearing (pin) 26 (FIG. 4). Roller 24 has sidewalls that are perpendicular to its axis, and that are adjacent but freely rotatable relative to interior sidewall surfaces 27 (FIG. 8) of frame 12.

Figure 8:
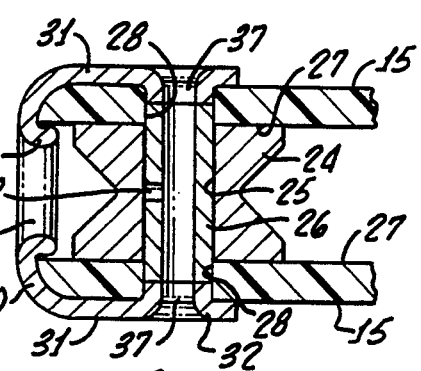

The sidewalls 15 of body 12 have cylindrical holes 28 (FIGS. 4 and 8) therein. These holes receive end portions of bearing 26, in snug-fitting relationship, but preferably not bindingly. As shown in FIG. 8, bearing 26 is longer than the space between the side surfaces of roller 24, so that the bearing ends extend into both holes 28. On the other hand, the bearing is not sufficiently long that either end thereof extends to the outer surfaces of sidewalls 15 of the body. Thus, as illustrated, each bearing end is recessed a short distance into its associated cylindrical hole 28.

On each of the roller guides 11a, 11b, 11c, 11d and 11e, there is mounted an identical (preferably including identity of size) combination element 29 that serves as the line guard and also as the means for maintaining (retaining) the bearing 26 and thus roller 24 in position.

Stated more specifically, element 29 is a U-shaped resilient clip, preferably formed of titanium sheet metal, and having a base 30 and identical sides 31. Preferably, base 30 lies in a single plane, and sides 31 extend perpendicularly to such plane. The combination line guard and bearing retainer 29 is resilient in that its sides 31 may be sprung a short distance apart following they will spring back towards each other to the free position illustrated in FIGS. 4 and 8.

Stamped on the distal regions of sides 31 are inwardly-extending protuberances 32 (FIGS. 4 and 8). Each of these is sized and located such that they will extend into the holes 28 (FIGS. 4 and 8) outwardly of the ends of bearing 26 when base 30 is adjacent rearwall 18 of the body. The protuberances do not extend all the way through the holes 28, in that each protuberance 32 and an associated bearing end is located in each hole 28 as shown in FIG. 8.

When the protuberances 32 are in their inserted positions in holes 28, sides 31 are in recessed regions 33 formed in the exteriors of sides 15 of the body. Such regions 33 correspond in shape to the guard sides 31, being adapted to receive the same so that—preferably—the exterior surfaces of the sides 31 are flush with those portions of sidewalls 15 which surround sides 31. Recessed regions 33 are defined by vertical shoulders.

The line guard and bearing retainer 29 is fixedly locked to body 12 by the protuberances 32 extending into holes 28, and by sides 31 extending into the correspondingly—shaped recessed regions 33.

Figure 7:
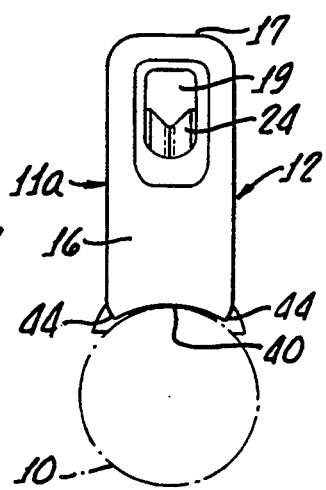

The base 30 of each combination line guard and bearing retainer 29 has a vertically—elongate opening 34 therein, having rounded ends, and that is adapted to receive the fish line. The edges 36 of base 30 that define opening 34 are rolled inwardly, that is to say into opening 22 (FIG. 4) in rearwall 18, the amount of rolling being such that the line 21 will not engage a raw edge of base 30. Furthermore, the size and location of opening 34 are such that the rolled edges 36 effectively maintain the line 21 over the peripheral groove in roller 24. Additionally, the line is, by the edges 36, kept spaced from the front-wall edges defining front opening 19 (FIG. 7).

Preferably, the opening 22 (FIG. 4) in rearwall 18 is sufficiently large that it is just covered by base 30 of the combination line guard bearing retainer 29. This reduces the weight of the roller guide in that less synthetic resin is employed. Stated otherwise, the base 30 is coextensive with rear opening 22.

To assemble any of the roller guides, it is merely necessary to insert a roller 24 into the open bottom of body 12, in such relationship that bore 25 in the roller is registered with holes 28 in the body sides. Bearing 26 is then inserted completely into bore 25, with one end of the bearing being in an inner region of each hole 28. Then, the sides 31 of combination line guard and bearing retainer 29 are sprung slightly apart, not past their elastic limit, and are manipulated to bring the protuberances 32 into registry with holes 28, following which they snap into such holes due to the resilient relationship of sides 31 to base 30. The roller may also be inserted through opening 22 (FIG. 4), such opening being large enough for this purpose when the line guard is not present.

The described snapping of protuberances 32 into holes 28 effects axial positioning of bearing 26, such that each end of the bearing is the same distance from the outer surface of its associated frame sidewall 15. The relationships are caused to be such that the identically-sized protuberances 32 are fully inserted into holes 28 when the interior surfaces of sides 31 engage the exterior surfaces of sidewalls 15 at recessed regions 33. The sidewalls 15 are sufficiently thick that the bearing ends are strongly supported thereby even though the bearing ends do not extend clear through holes 28 in the preferred device shown and described herein.

When the roller guides 11a, 11b, 11c, 11d and 11e are assembled as described, and are mounted on the blank 10 as stated below, they operate effectively to keep the line 21 on the rollers 24 so that there is rolling action instead of the sliding friction which characterizes ring guides and which generates heat between rings and line. This important benefit is achieved with extremely lightweight devices; a set of eight of the described roller guides typically weighs about one ounce.

To further reduce friction, lubricating oil is provided in the spaces between bearings 26 and the sidewalls of bores 25 through rollers 24. For this purpose, small oil holes 37 (FIG. 8) are provided in the protuberances 32. Furthermore, the bearings 26 are caused to be hollow and to have a radial oil port 38 as shown in FIG. 8. The effect lubrication, oil is inserted through a hole 37 so that it flows through bearing 26 and port 38 to the annulus between the exterior of bearing 26 and the wall of bore 25. Pressure may be supplied by covering one of the holes 27 while oil is injected into the other. (It is also possible to make only half of the length of the bearing hollow, the other half being solid or blind. Port 38 connects to such hollow portion.)

There will next be described how the roller guides are mounted onto blank 10 in a very strong manner yet one which does not significantly diminish the high flexibility of the blank 10, and one which does not tend to effect breakage of any foot or twisting of any body.

Figure 3:
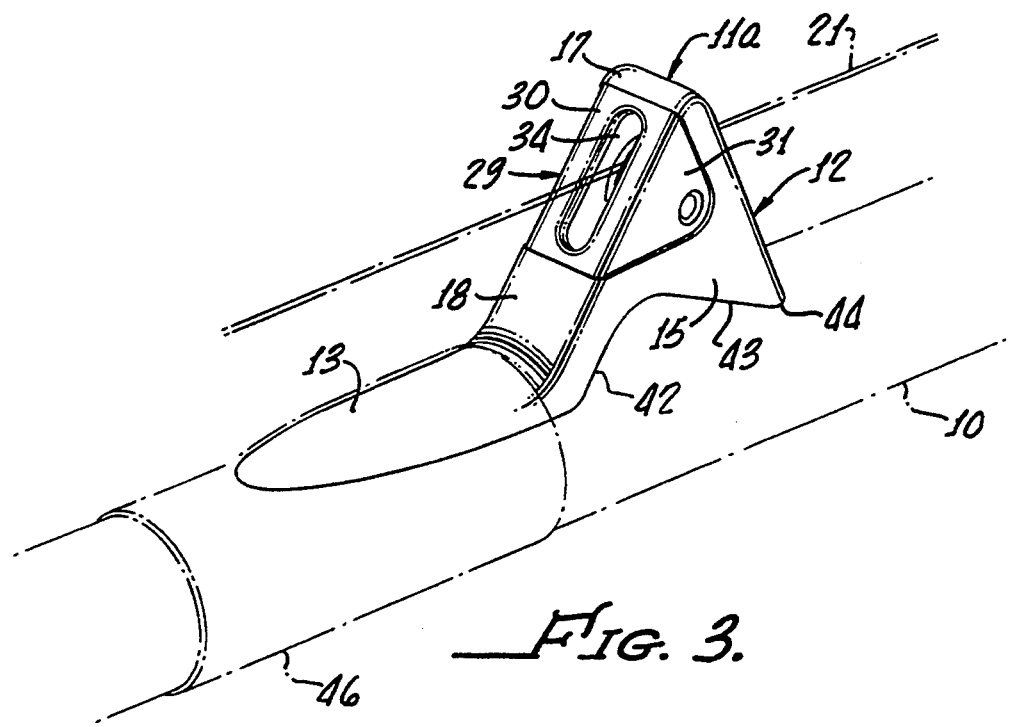

Referring to FIGS. 2-4, it is pointed out that the single foot 13 has a longitudinal axis that extends generally parallel to blank 10 and which, if extended, would pass below bearing 26 for the roller. The lower portion of the body 12 also extends longitudinally of the blank and in only a single direction from the foot 13. After foot 13 as bound to the blank as described subsequently, there are numerous conditions of operation when body 12 is cantilevered from the bound foot 13—not being supported by blank 10 in any other way.

Although there is, in the greatly preferred embodiment, only a single foot—from which the frame is cantilevered—the invention also provides as one of its aspects the supporting of the body from blank 10 at regions other than foot 13. This occurs for certain roller guides on certain types of rods and at certain positions on such rods and during certain conditions of operation.

Referring to FIG. 2, there is a radiused or curved edge 40 of body 12 at the lower-front corner thereof, spaced from foot 13 and adapted at its center to rest on blank 10. When the blank is not flexed, the preferred relationship is one where the curved edge 40 rests on the upper side of the blank. When the blank is flexed downwardly as by a fish on line 21, the blank tends to flex away from curved edge 40 and very often does. The body 12 is then supported entirely by foot 13, there being no second support. Especially, there is no second foot bound to the blank and which could tend to break or to effect breakage of a body portion at a transition region with a foot.

The constructions of the guides 11a, 11b, 11c, 11d and 11e are such that there are certain conditions for certain roller guides where the foot 13 bends sufficiently, when the blank is bent downwardly, that edge 40 remains supported on the blank. This is due to downward pressure exerted by line 21 on roller 24. At such times, there is not a cantilevered relationship in that there is body support remote from foot 13, but the supported region is not (in accordance with this aspect of the invention) connected to the blank.

Figure 5:
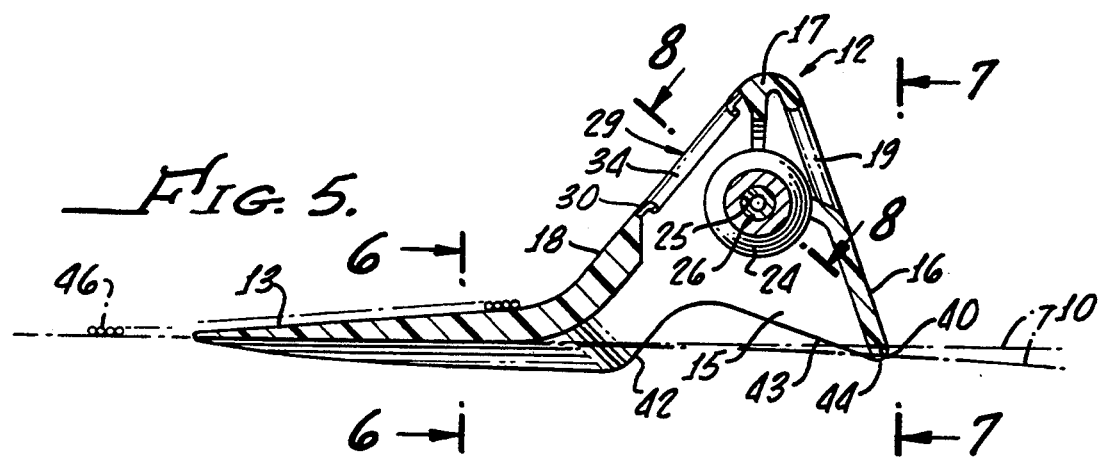
FIG. 5 is an enlarged vertical central sectional view thereof.

FIG. 5 shows, at the right, two conditions of the upper edge of blank 10. In one condition, the blank is not flexed. In the other (bottom line) condition, the blank is flexed downwardly away from edge 40 (FIG. 2) so that there is then pure cantilevered support of body 12.

Figure 6:
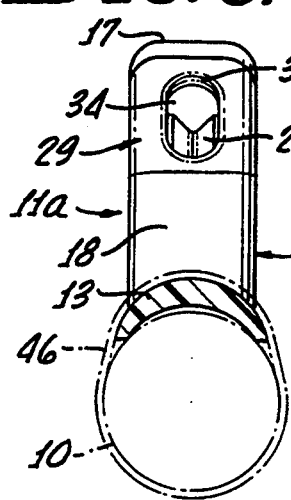
FIGS. 6—6, 7—7 and 8—8 are views on the correspondingly numbered lines of FIG. 5.
Figure 11:
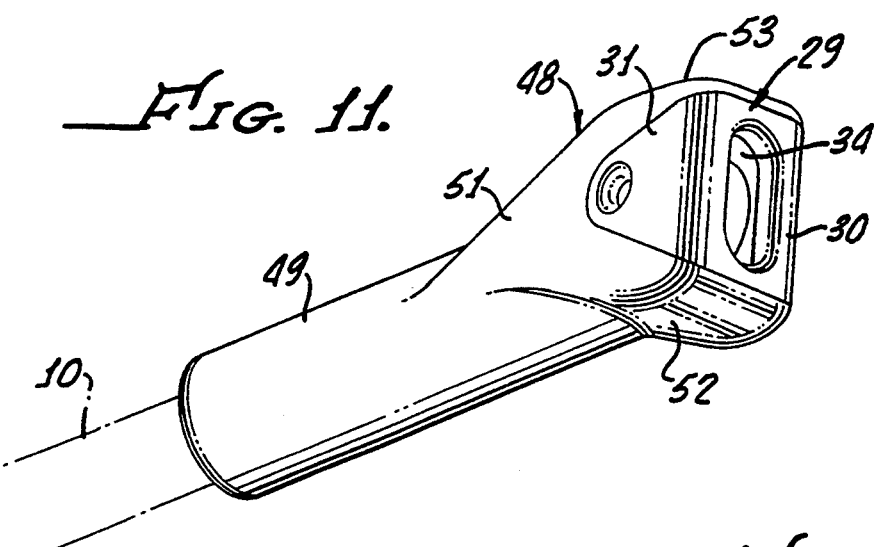
FIG. 11 is an enlarged isometric view of the tip.

Proceeding next to a description of the foot 13 and the lower regions of body 12, it is pointed out that the foot tapers divergently toward the body 12 and, furthermore, that the foot wraps somewhat around the upper portion of the blank (FIGS. 5-7). Thus, there is a longitudinal groove in the underside of each foot 13a, 13b, or 13c, (FIGS. 10 and 11) of different-size guides. Each such groove is adapted to receive the upper side of blank 10 at the appropriate region of the blank. For the small roller guide having a foot adapted to seat on blank 10 relatively near the tip, the amount of wrapping of the foot around the blank is quite large. On the other hand, for the roller guide adapted to seat on blank 10 relatively near the butt, there is much less wrapping of the foot around the blank and consequently more flexibility of the foot than is the case relative to the guide indicated in the preceding sentence. These latter roller guides therefore have more tendency to flex downwardly with the blank until the edge 40 (FIG. 2) is supported on the upper blank surface. (It is to be understood that it is normally only a center point of edge 40 that rests on the blank—not the entire edge.)

The region of each foot 13 relatively adjacent body 12 is relatively thick and strong. The region of body 12 adjacent the foot is strong yet lightweight, being a downwardly—open channel construction as shown in FIGS. 4 and 5. The end of each foot remote from the body is highly feathered in the mold; thus, it need not be ground before wrapping occurs.

The upper surface of each foot 13 is caused to be rough, by roughening the foot portion of the mold in which the frame 12 and foot 13 are molded, thus minimizing the tendency toward sliding of binding line on the foot surface. To assemble a roller guide to blank 10, foot 13 is wrapped or bound onto the blank 10 as by (for example) A or B—size nylon thread. Thereafter, epoxy finish liquid is applied to the threads and to adjacent regions, and allowed to cure so as to complete the mounting operation.

There is caused to be a small pool of liquid finish at the foot end of body 12. On the other hand, the construction of the body is caused to be such that epoxy does not flow up into the roller 24 or its bearing. One of numerous shapes for permitting such upward flow of epoxy is shown (for example) at the bottom of FIGS. 4 and 5, each illustrated lower edge bending upwardly at 42 at a relatively steep angle and inclining gently downwardly at 43 to the points 44 which are at the outer sides of body 12 at opposite ends of the curved edge 40 (FIG. 2).

There is a longitudinal groove (not shown) in the underside of each foot 13, and which is adapted to receive epoxy or finish. This creates a key action which cooperates with the large surface area between foot and blank, with the nylon thread, with the upper rough foot surface, etc., to provide very strong mounting of the roller guide. It is to be understood that there is epoxy below each foot, as well as in the wrap threads. The impregnated wrap threads are shown at 46 in FIGS. 2 and 3.

With the described guide construction, there has been taken away the foot—breakage potential caused by flexing of the blank; the blank typically flexes away from the frame without pulling any foot with it. On the other hand, as described above, there are situations where the downward pressure created by the line on a roller causes the roller guide to flex downwardly with the blank, to a certain extent, the curved edge 40 under these conditions remaining in contact with the blank.

Description of the Tip (Tip-Top)

The tip is illustrated in FIGS. 11–14. It has the same roller 24, the same combination line guide and bearing retainer 29, and the same bearing 26 as what is described above relative to the line guides. In addition, the tip has a molded synthetic resin body 48 (preferably formed of the composition stated above), which is integral with a synthetic resin sleeve 49. Sleeve 49 telescopes over the outer end of blank 10 and is secured thereto by epoxy or other means.

The roller, bearing, and combination line guard and bearing retainer are mounted to tip body 48 the same as described above relative to the mounting of those elements in the frame 12.

The tip is symmetrical (a mirror image) about a vertical plane containing the axis of sleeve 34.

Figure 12:
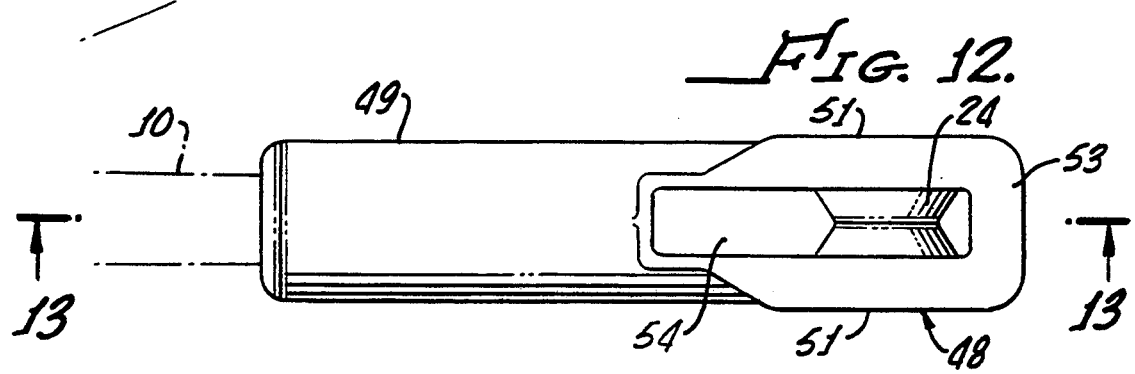
FIG. 12 is a top plan view thereof.
Figure 13:
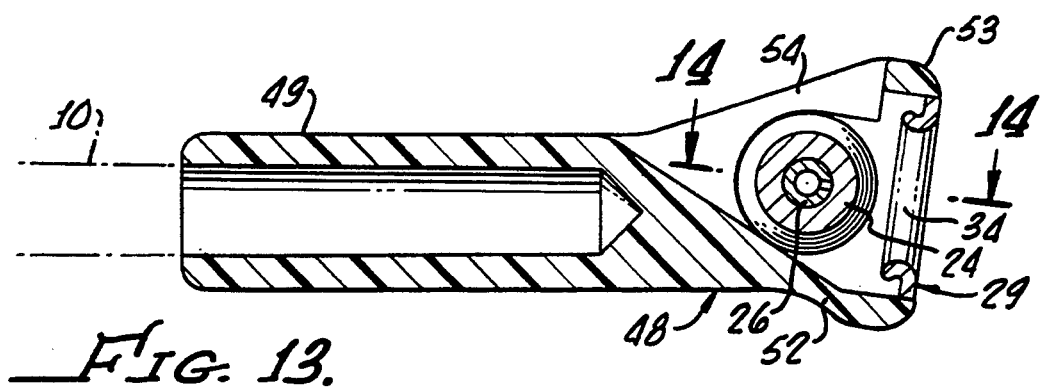
FIG. 13 is a vertical central section thereof.

Tip body 48 has parallel vertical sidewalls 51, a bottom wall 52 and an outer-top cross member 53 (FIG. 12). Within the cross member 53 and between the sidewalls 51 there is defined a large top opening 54 through which the line passes downwardly over roller 24. The line does not pass out the bottom of body 48 since such passage is blocked by bottom wall 52. Instead, the line passes forwardly through the vertically-elongate opening 34 in the base 30 of combination line guard and bearing retainer 29. As above stated, the edges defining such opening are rolled so as to prevent contact of the line therewith.

Figure 14:
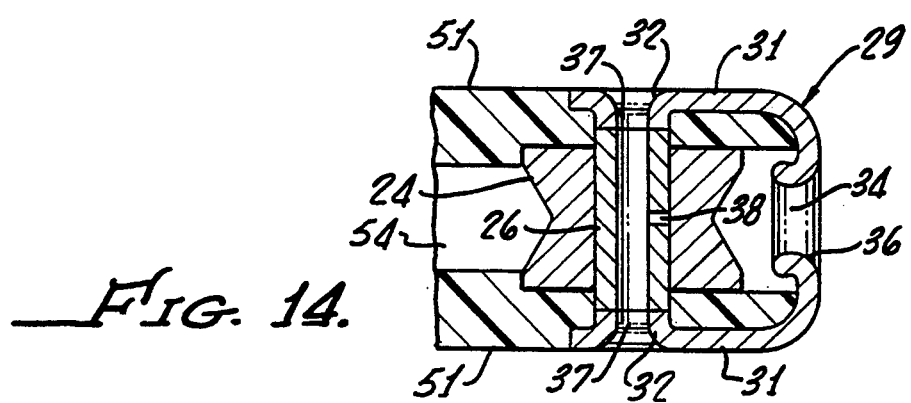
FIG. 14 is an enlarged fragmentary section on line 14—14 of FIG. 13.

Except for cross member 53, and except for bottom wall 52, the forward side of tip body 48 would be open were its not for the presence of the combination guard and retainer 29. The forward edges of sidewalls 51 are generally vertical and straight, and when the combination guard and retainer 29 is mounted in position (by snapping) as shown in FIG. 14 and as described above, the base 30 thereof is deposed in a generally vertical plane. Correspondingly, the rolled edges 36 defining opening 34 lie generally in a vertical plane when the axis of the tip is horizontal.

The outer surfaces of sidewalls 51 are recessed correspondingly to the shapes and thicknesses of sides 31 of line guard and bearing retainer 29. Accordingly, when such bearing retainer is snapped into position as described in detail above relative to the guides, the outer surfaces of sides 31 are substantially flush with those regions of the outer surfaces of sidewalls 51 that surround such sides 31. As was the case with the guides, the shoulders adjacent the recessed regions cooperate with protuberances 32 in holding element 29 fixed to the body 48. The holes in sidewalls 51 correspond to holes 48 in sidewalls 15.

An exemplary thickness of each sidewall 15 (namely, the axial dimension of each cylindrical hole 28), and the width of each sidewall 51 and its associated cylindrical hole, is about 0.050 inch. The ends of bearing 26 penetrate about half way into each hole, in the example, or about 0.025 inch. The protuberances 32 penetrate approximately the other half way into each such hole, namely 0.025 inch approximately.

In all embodiments, the sides of the roller may be recessed somewhat into the frame or body sides, to further reduce the possibility of line getting between roller sides and frame sides.

It would be possible, but not preferred, to attach the line guard to the frame by means of pins or screws, etc.

In a less good construction, not preferred, the bearing ends could go clear through the holes in the frame sides, and extend somewhat outwardly from such holes. Then, the described protuberances would be replaced by cups that open inwardly, each cup snugly receiving a bearing end.

An internal wide protuberance or "bump" may be molded integrally on the underside of body wall 18 adjacent frame 13. This is to further prevent epoxy from moving excessively away from the foot, and to provide a strong region of adhesively connected epoxy and frame material.

The foregoing detailed description is to the clearly understood as given by way of illustration and example only, the spirit and scope of this invention being limited solely by the appended claims.

What is claimed is:

1. A line guide for mounting on fishing rod blanks, said guide comprising:
 (a) a roller body or frame, said body having front, rear and side portions, and also having a bottom region,
 (b) roller means on said body to guide a fishing line therethrough in low friction manner, and
 (c) a single foot extending outwardly from said body and adapted to be secured to the blank of a fishing rod,
  said body not having any other foot extending therefrom that is adapted to be secured to the blank of a fishing rod, said single foot and said body being so related to each other that when said body, roller means and foot are disposed on the upper side of a horizontal fishing rod blank, and said foot is fixedly secured to said blank, said body is not directly above any substantial portion of said foot, there being no upwardly-extending connector between said foot and said bottom region of said body, said bottom region of said body being close to said blank when said body, roller means and foot are thus mounted on the upper side of a horizontal fishing rod blank.

2. The invention as claimed in claim 1, in which said foot is elongate and is adapted to be secured to said blank longitudinally thereof, and in which said body is connected to one end of said foot and extends away from said foot.

3. The invention as claimed in claim 2, in which when said body, roller means and foot are mounted on the upper side of a horizontal fishing rod blank, in spaced relationship from the butt end of said blank, a portion of said body remote from said foot is so located relative to the remainder of said body and to said foot, as to be adjacent said blank and on the opposite end of said body from said foot, and in which said last-named portion is adapted to move in a direction away from said blank when the outer portion of said blank is flexed downwardly relative to the inner portion of said blank.

4. The invention as claimed in claim 2, in which said foot has a longitudinal groove in the underside thereof, said groove being adapted to receive an upper portion of a generally cylindrical fishing rod blank.

5. The invention as claimed in claim 2, which said foot is tapered away from said body to a feathered end edge that is remote from said body, said end edge and said foot being adapted to have line bound thereon to secure said foot to said blank, and in which said body and foot are molded of synthetic resin.

6. The invention as claimed in claim 2, in which said body has a lower portion steeply inclined adjacent said foot in order to prevent liquid epoxy from moving into said roller means.

* * * * *